Aug. 14, 1945.  S. B. HASELTINE  2,382,563
FRICTION SHOCK ABSORBER
Filed Dec. 24, 1943
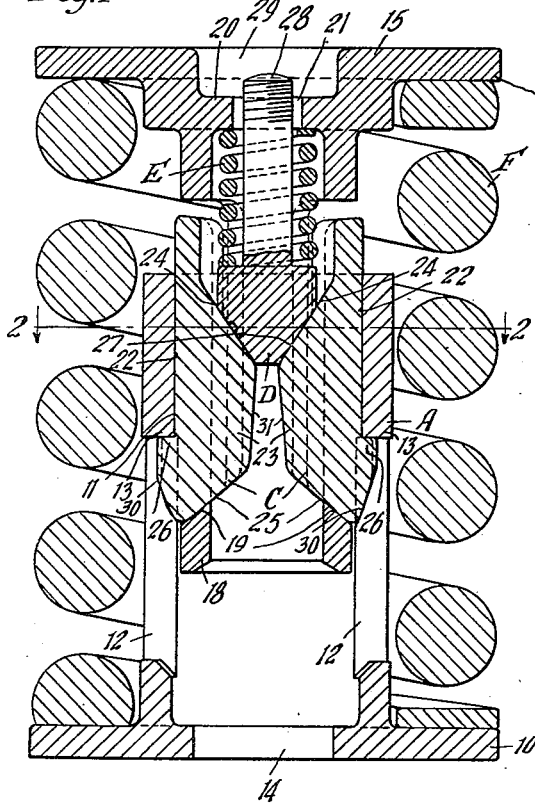
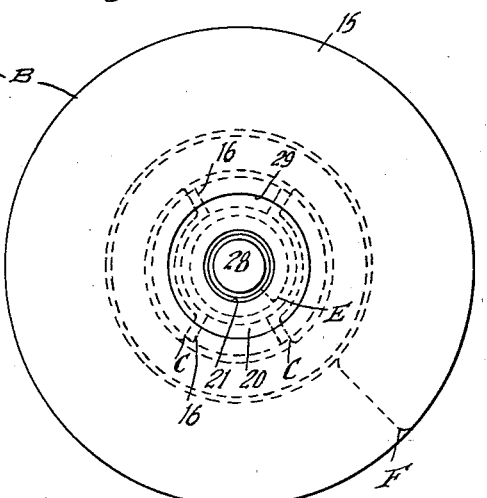
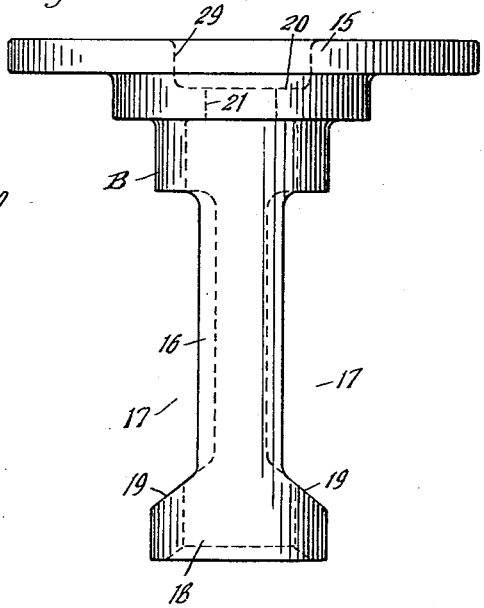
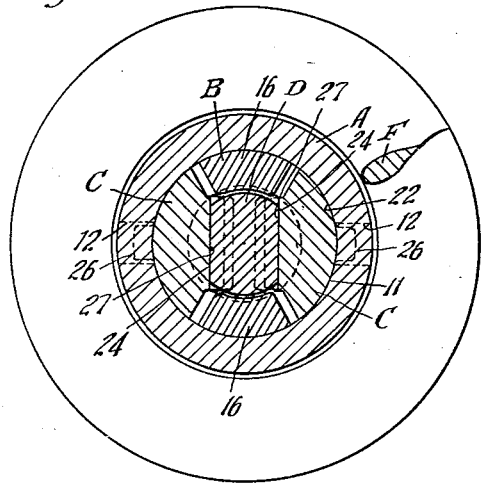
Inventor
Stacy B. Haseltine
By Henry Fuchs
Atty.

Patented Aug. 14, 1945

2,382,563

UNITED STATES PATENT OFFICE 2,382,563

FRICTION SHOCK ABSORBER

Stacy B. Haseltine, La Grange, Ill., assignor to W. H. Miner, Inc., Chicago, Ill., a corporation of Delaware Application December 24, 1943, Serial No. 515,517

2 Claims. (Cl. 267—9)

This invention relates to improvements in friction shock absorbers, especially adapted for use in connection with railway car truck springs for snubbing or dampening the action of the same.

One object of the invention is to provide a friction shock absorber for snubbing the action of truck springs of a railway car, wherein the frictional resistance provided is substantially constant during operation of the same in both compression and release.

A more specific object of the invention is to provide a friction shock absorbing device, comprising a friction casing, shoes having sliding frictional engagement with the inner walls of the casing, a spring follower by which the shoes are carried, a spring resistance opposing relative movement of the casing and follower; and means exerting substantially constant pressure for forcing the shoes against the friction surfaces of the casing, wherein said means comprises wedge members engaged with opposite ends of the shoes, one of said wedge members being fixed with respect to the follower, and the other of said wedge members being spring actuated by spring means interposed between said last named wedge member and a fixed abutment of said follower.

Other objects of the invention will more clearly appear from the description and claims hereinafter following.

In the drawing forming a part of this specification, Figure 1 is a longitudinal, central, vertical sectional view of my improved shock absorber. Figure 2 is a transverse, horizontal, sectional view, corresponding substantially to the line 2—2 of Figure 1. Figure 3 is a top plan view of Figure 1. Figure 4 is a front elevational view of the combined post and upper follower shown in Figure 1.

The improved shock absorber disclosed in the drawing is of the type usually employed as a snubber in connection with truck springs, the same being interposed between the top and bottom spring follower plates of the truck spring cluster, being substituted for one or more of the spring units of a cluster of truck springs.

My improved shock absorber comprises broadly a friction casing A; a combined follower and wedge post B; two friction shoes C—C; a wedge block D; a spring E yieldingly forcing the block D against the shoes; and a second spring F opposing relative movement of the casing and combined follower and post.

The casing A is of circular transverse cross section and has a laterally, outwardly projecting annular base flange 10 forming, in effect, a follower member. The interior of the casing at the top end thereof presents a longitudinally extending, transversely curved friction surface 11 of true cylindrical form. At diametrically opposite sides of the casing, the walls thereof are longitudinally slotted, as indicated at 12—12. The upper ends of the slots 12—12 are spaced some distance inwardly from the upper end of the casing and the upper ends of said slots present transverse walls which form stop shoulders 13—13 for the shoes C—C, as hereinafter pointed out. The bottom wall of the casing is provided with an opening 14 adapted to receive the usual spring centering projection of the lower spring follower plate of the truck spring cluster of a railway car.

The combined follower and post B, comprises a relatively heavy circular plate member 15 having a hollow tubular post 16 centrally depending therefrom. Between the top and bottom ends thereof, the side wall of the post is cut out at diametrically opposite sides of the same, as indicated at 17—17, to accommodate the friction shoes C—C. The post 16 thus presents an enlarged head portion 18 at its lower end. The head portion 18 is provided with inner wedge faces 19—19 which are inclined inwardly and upwardly. At its upper end where it joins the plate member 15, the hollow post 16 has a transverse end wall 20 which is provided with a central opening 21. The wall 20 serves as an abutment for the spring E. The hollow tubular post 16 of the combined follower and post B is loosely telescoped within the casing A, and is adapted for lengthwise sliding movement with respect to the latter.

The friction shoes C—C are of like design. Each shoe C has an outer, longitudinally extending, transversely curved friction surface 22 adapted to engage the interior friction surface 11 of the casing A. Each shoe is laterally inwardly enlarged, as indicated at 23. The enlargement 23 of each shoe is provided with an upwardly and outwardly inclined inner wedge face 24 at the upper end portion of the shoe and an upwardly and inwardly inclined wedge face 25 at the lower end of the shoe. Each shoe C also has a laterally outwardly projecting stop lug 26 at its lower end adapted to cooperate with one of the stop shoulders 13 of the casing A to limit outward movement of the shoes with respect to the casing.

The friction shoes C—C are arranged at opposite sides of the mechanism and are accommodated within the openings provided by the cut out portions 17—17 of the post 16 with the inward enlargements 23—23 thereof projecting into the hollow interior of the post. The wedge faces 24—24 at the upper ends of the shoes are thus opposed to each other as well as the wedge faces 25—25 at the lower ends of the shoes.

The wedge block D is disposed within the upper end of the hollow post 16 and has a conical wedge portion at its lower end presenting wedge faces 27—27 at opposite sides thereof engaging the upper wedge faces 24—24 of the shoes C—C. The wedge block D has an upwardly extending central stem 28 which extends through the opening 21 of the end wall 20 of the hollow post 16.

The spring E comprises a relatively light coil surrounding the stem 28 of the wedge D and has its upper and lower ends bearing respectively on the wall 20 of the post 16 and the upper end face of the block D. This spring is under initial compression and forces the wedge against the shoes to hold the same spread apart and in frictional contact with the interior friction surface 11 of the casing A, the two shoes engaging opposed friction face portions of said friction surface. In their spread apart condition, as shown in Figure 1, the lugs 26—26 of the shoes C—C are engaged under the stop shoulders 13—13 of the casing, thereby limiting relative longitudinal separation of the shoes and casing. Inasmuch as the shoes abut the wedge faces 19—19 of the post 16, outward movement of the combined post and follower B with respect to the casing is thus also limited. As will be evident, the shoes, by their shouldered engagement with the casing A and their wedging engagement with the post 16, serve to maintain the mechanism assembled.

The spring resistance F comprises a relatively heavy coil surrounding the casing A and the post 16. This spring is under initial compression and has its top and bottom ends bearing respectively on the follower plate 15 of the post 16 and the flange 10 of the casing A and yieldingly opposes relative lengthwise movement of the post and casing toward each other.

As shown in Figure 1, the upper end of the stem 28 of the wedge D is threaded, so that a nut may be applied to draw the wedge upwardly against the pressure of the spring E, in assembling the mechanism, thereby providing clearance to facilitate placing the shoes C—C within the side openings of the post 16.

As also shown in Figure 1, the follower plate portion 15 of the combined follower and wedge post B is preferably provided with a central depression or seat 29 adapted to receive the spring centering projection of the upper spring plate of a cluster of truck springs.

In assembling my improved friction shock absorber, the combined follower and wedge post B is placed in inverted position with reference to the position shown in Figure 1, that is, with the post 16 projecting upwardly. While in this position the wedge D, with the spring E surrounding the stem thereof, is placed within the post 16 through the open upper end thereof. A nut is then applied to the stem 28 of the wedge to draw the same downwardly to provide sufficient clearance between the wedge block D and the wedge faces 19—19 at the upper end of the post to permit easy application of the shoes C—C. The shoes are then placed in position within the post. The spring E is then placed over the post with its lower end resting on the plate member 15. As will be evident, with the combined follower and post B in inverted position, and the wedge D withdrawn from contact with the shoes, the latter rest on the inner end walls of the openings 17—17 of the post. As shown in Figure 1, the inner ends of the shoes which rest on the inner end walls of the openings 17—17 are beveled, thus causing the shoes to swing inwardly at their outer ends. The casing A, in inverted position, is then assembled with the other parts by telescoping the same over the post 16. In the event that the shoes project slightly from the sides of the post, the same will be cammed inwardly, the outer sides thereof being beveled, as indicated at 30. This displacement of the shoes toward each other is permitted by clearance provided therebetween, the inner sides of the shoes being provided with diverging opposed faces 31—31. The lugs 26—26 of the shoes thus readily pass into the casing. The parts are forced together, against the resistance of the spring F, until the lugs 26—26 reach a position beyond the shoulders 13—13 of the casing, whereupon the lugs are engaged in back of the shoulders 13—13. The lugs 26—26 are positively forced into engagement with the shoulders 13—13 by the spreading action of the spring actuated wedge D pressing against the shoes C—C. This spring action is effected by freeing the wedge through removal of the holding nut from the stem 28 of the wedge D.

The operation of my improved shock absorber is as follows: Upon the spring cluster of the truck of the railway car being compressed between the spring plates of the cluster, the combined follower and wedge post B and the friction casing A are moved in lengthwise direction toward each other, thereby compressing the spring F and sliding the shoes C—C along the friction surfaces of the casing, thus providing the required frictional resistance to snub the action of the coils of the truck spring cluster. During recoil of the truck springs, expansion of the spring F returns all of the parts to the normal position shown in Figure 1, outward movement of the shoes being limited by shouldered engagement thereof with the shoulders of the casing A, and outward movement of the combined follower and wedge post B being, in turn, limited by wedging engagement of the shoes therewith. As will be evident, the frictional resistance provided between the shoes C—C and the casing A being constant during all phases of the operation of my improved friction shock absorber, the same amount of frictional resistance to snub the action of the truck springs is provided during both compression and recoil of the truck springs.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with an upper follower; of a lower friction casing; a depending hollow tubular post integral with said follower, said post being open at opposite sides between the top and bottom ends thereof, said post extending into said casing; a pair of friction shoes mounted within the side openings of said post, said shoes having wedging engagement at their lower ends with said post, and sliding engagement with the interior walls of the casing; a central wedge block having spreading engagement with the shoes at the upper ends thereof; a spring reacting between the follower and said wedge yieldingly forcing the latter against the shoes; and a second spring yieldingly opposing relative movement of the follower and casing toward each other.

2. In a friction shock absorber, the combination with an upper follower having a laterally projecting annular flange; of a lower cylindrical friction casing open at its upper end and having a laterally projecting annular flange at its lower end; a centrally depending tubular sleeve integral with said follower, said sleeve extending into the casing, said sleeve having upwardly facing wedge faces at its lower end; a pair of friction shoes carried by said tubular sleeve and telescoped within the casing, said shoes having cylindrical outer friction surfaces engaged with the interior of the casing, said shoes having wedge faces at their lower ends seated on the wedge faces of the tubular sleeve, said shoes having wedge faces at their upper ends on the inner sides thereof; a central wedge block engaged between the upper wedge faces of said shoes; a spring reacting between said follower and wedge block to force the latter against the shoes; and a coil spring surrounding said casing and bearing at its top and bottom ends on the flanges of said follower and casing respectively.

STACY B. HASELTINE.